United States Patent Office 3,427,056
Patented Feb. 11, 1969

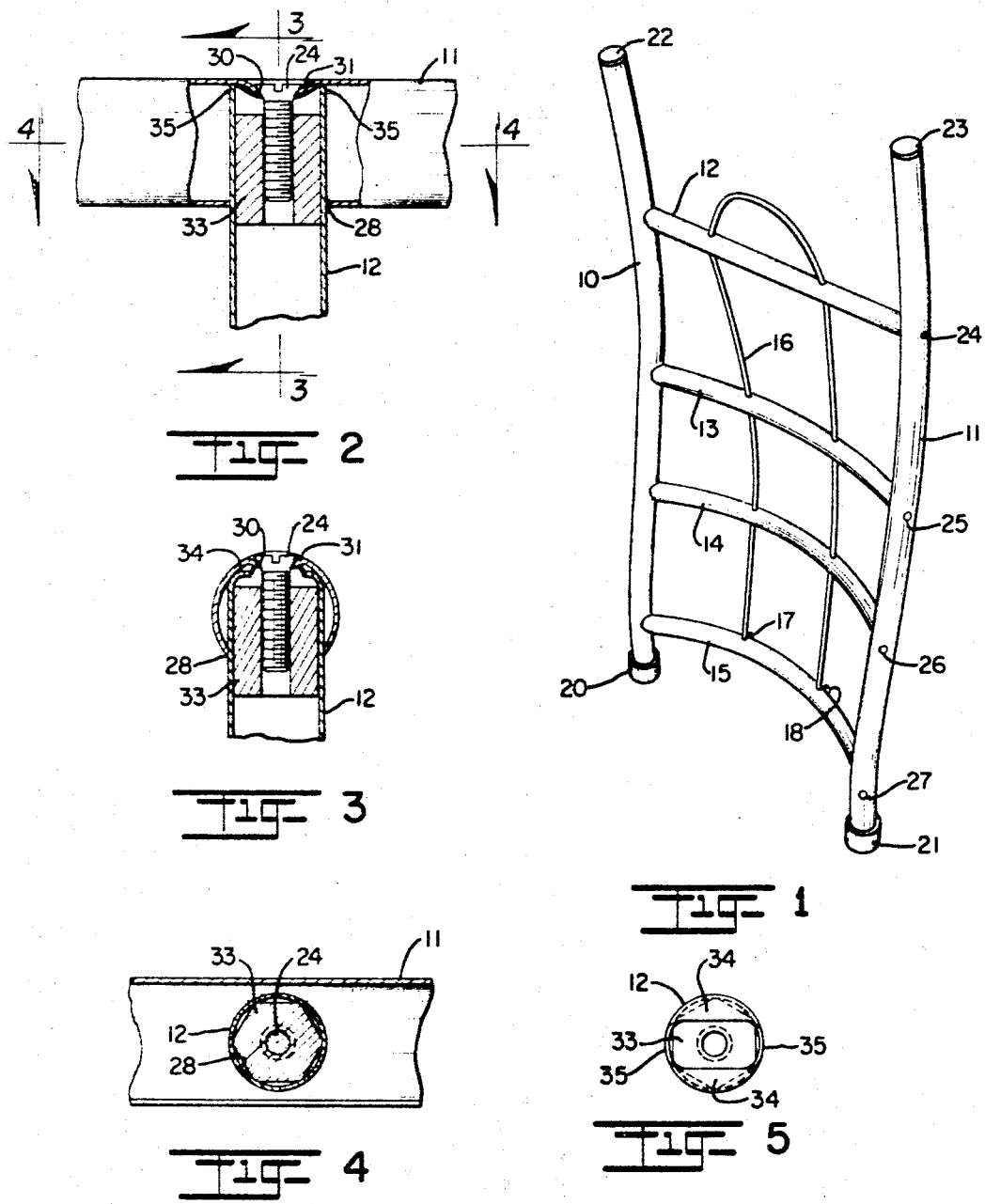

3,427,056
JOINT STRUCTURE FOR TUBULAR MEMBERS
Gerald A. Cunningham, 2465 20th St.,
Boulder, Colo. 80202
Filed Feb. 25, 1966, Ser. No. 530,053
U.S. Cl. 287—54       3 Claims
Int. Cl. F16b 7/18

ABSTRACT OF THE DISCLOSURE

A detachable joint for tubular frame structures comprises two structural tubes one larger than the other and fitted into the other through a hole of the size and configuration of the smaller tube. A plug fits snugly within the end of the smaller tube which is deformed to conform to the inner wall of the larger tube. A screw is passed through a small hole in the larger member opposite the first hole and is tightened to draw the plug into clamping engagement with the deformed end of the smaller tube and to clamp the entire assembly securely together. The joint is particularly useful for joining thin walled tubes and provides effective reinforcement for such joints.

This invention relates to metal frame structures and particularly to an improved arrangement for connecting tubular members to one another to provide a rigid joint.

Tubular frame structures are employed for many purposes and the individual tubes are joined or connected in various ways. For some structures the tubes may be welded together; however, when lightweight structures are employed it is desirable to use thin walled tubes of lightweight metal such as aluminum and it becomes difficult to provide an adequate welded bond between tubes at the joints which does not result in weakening of the structures because of the high temperatures required during the welding process and extreme care must be exercised in the fabrication of such structures.

One example of lightweight tubular structure is the metal pack frame provided for facilitating the carrying of heavy loads on a person's back. It is desirable to make such frames as light in weight as possible but it is also necessary that the frame be capable of carrying heavy loads without deformation or breaking. It is also desirable that the frame elements be detachable for purposes of repair or replacement. Accordingly, it is an object of this invention to provide an improved structural joint for the rigid connection of transverse tubular members.

It is another object of this invention to provide an improved detachable joint for tubular frame structures and the like.

It is another object of this invention to provide a simple and rugged detachable joint structure for the rigid connection of tubular frame members.

Briefly, in carrying out the objects of this invention in one embodiment thereof, a pack frame is constructed from aluminum tubing members comprising a pair of upright main frame members and a plurality of tubular cross members of smaller diameter. Each of the cross members is secured to the main members by detachable joints formed by providing pairs of large and small aligned openings in the main members and inserting the ends of the cross members in the larger openings. Each of the cross members carries a rigid plug adjacent its end and the end is deformed to fit closely the contour of the inner curved wall of the main member adjacent the smaller hole. The plug also extends within the cross member beyond the wall of the main member outside the large hole and reinforces the cross member. The two members are secured rigidly together by a screw which enters the small hole and engages a threaded bore in the plug and, upon tightening, clamps the plug rigidly against the deformed wall of the end of the cross member and thus secures the end against the inner wall of the main member. A pack constructed in this manner is strong, light and rigid and yet may readily be disassembled for replacement of parts or repair.

The features of novelty which characterize this invention are set forth with particularity in the accompanying claims. The invention itself, however, both as to its organization and method of construction, together with further objects and advantages thereof, will be more readily understood from the following description taken in connection with the accompanying drawing in which:

FIG. 1 is a perspective view of a pack frame having joints embodying the invention;

FIG. 2 is an enlarged view partly in section of one of the joints of the frame of FIG. 1;

FIG. 3 is a sectional view taken along the line 3—3 of FIG. 2;

FIG. 4 is a sectional view taken along the line 4—4 of FIG. 2; and

FIG. 5 is an end view of one of the frame cross members.

Referring now to the drawing, the pack frame of FIG. 1 comprises two generally parallel main tubular frame members 10 and 11 connected by four cross members 12, 13, 14 and 15. These cross members are curved to varying degree to provide the desired configuration of the frame, the top member 12 being substantially straight and the other cross members curved on shorter radii progressively downwardly. An auxiliary pack support member or loop 16 is formed by a U-shaped rod the legs of which extend downwardly through holes provided in the cross members 12, 13, 14 and 15 and which is secured to the cross member 16 by clamping the ends to the cross member after they have passed through the holes in the cross member as indicated at 17 and 18. The main members 10 and 11 are of a slightly curved configuration laterally of the general plane of the frame to provide the desired shape of the pack frame and the lower ends of the members are provided with rubber end guards or feet 20 and 21, respectively, while the upper ends are provided with rigid plastic caps 22 and 23, respectively. Each of the cross members 12, 13, 14 and 15 is held securely to the main member 11 by conical headed screws 24, 25, 26 and 27, respectively. Corresponding screws, not visible in FIG. 1, are employed for securing the opposite ends of the cross members to the member 10.

The arrangement of the joint structure whereby the screws 24, 25, 26 and 27 are employed to provide a rigid yet detachable joint is shown in the detailed sectional views, FIGS. 2, 3, 4 and 5. These views illustrate the upper right-hand joint as provided between the cross member 12 and the member 11. As shown in these figures, the tube 11 is provided with a hole having a size and configuration to receive the end of the cross member 12 and to fit closely about the periphery of that member; a smaller hole is provided in the opposite wall through which the screw 24 is inserted. The edge of the first hole is indicated at 28 in FIG. 2 and that of the second smaller hole at 30. The wall of the tube 11 about the hole 30 is indented as indicated at 31 to provide a countersink depression for the conical head of the screw 24.

A solid metal plug 33 is pressed into the end of the tube 12 and held by frictional engagement with the inner wall of the tube. The plug 33 is of hexagonal cross section as indicated in FIGS. 4 and 5 and thereby provides six edges or ribs which are the portions of the plug engaging the inner wall of the tube. This arrangement of ribs which extend axially of the tube into which the plug is pressed is particularly useful when the tubing is a commercial grade constructed from materials such as seamless aluminum alloy and has internal diameters which may vary within fairly wide tolerances. The ribbed configuration of the plug makes insertion and positioning of the plug easy and at the same time provides a secure frictional grip in tubings within such tolerances so that the plug does not become loose in the tubing during use of the finished frame. This ease of insertion of the plug results from the small contact area of the ribs or ridges which effect a slight deformation of the inner wall of the tubing when it has a small diameter within the normal range of tolerances, but which ribs engage the inner wall with good frictional engagement when the tubing has an inside diameter in the upper end of the range.

The end of the tubing 12 is bent on opposite sides of a longitudinal center line as indicated at 34 in FIGS. 3 and 5 so that it provides a curved surface effectively conforming to the curved inside surface of the wall of the tube 11. The portions of the end of the tubing 12 which lie on an axis at right angles to the axis of the bent portions and are in axial alinement with the longitudinal axis of the tube 11 are straight as indicated at 35 in FIGS. 2 and 5 and the deformation of the end of the tubing thus is effected to provide a generally cylindrical end surface contour.

As indicated, the plug 33 is provided with a central threaded bore into which the screw 24 is threaded. As will be understood from the view shown in FIG. 3, the plug end is drawn against the inwardly bent portions 34 where they first turn in from the inside wall of the tube 12; this engagement of the plug end together with the friction between the axial plug edges or ribs and the inside wall draws the tube end against the inside wall of the tube 11 so that the plug clamps the deformed portions of the end of the tubing 12 securely against the inside wall of the tubing 11 about the hole 30 and depression 31. The straight portions 35 of the end of the tubing 12 as shown in FIG. 2 engage the inner wall of the tubing 11 along an axial line most remote from the hole 30 and together with the deformed portions 34 provide engagement with the inner wall of the tube 11 on all sides of the screw. This prevents rotation of the tubing 12 about its axis because any such rotation would require a camming movement of the ends 35 over the curved wall of the tube 11 to drive the tube 12 outwardly through the hole 28 and such movement is prevented by the screw.

The plug 33 extends within the end of the tubing 12 outwardly through the opening 28 and, since the ridges of this plug are in good frictional engagement with the tubing 12 throughout their lengths, this extension reinforces the tubing as it passes through the opening in the larger tubing 11 and further facilitates the forming of a tight rigid joint.

Although the joint formed in the manner illustrated in FIGS. 2, 3, 4 and 5 is secure and rigid and resists loosening by vibration, nevertheless it may readily be detached by removing the screw 24. Thus a secure and rigid joint is provided without requiring bonding of the metal parts by welding, brazing or other methods. Furthermore, a simple and fully reinforced rugged structure is made with a minimum number of parts.

While the invention has been described in connection with a specific application and specific details of construction, various other applications and modifications will occur to those skilled in the art. Therefore it is not desired that the invention be limited to the details illustrated and described and it is intended by the appended claims to cover all modifications which fall within the spirit and scope of the invention.

I claim:
1. A detachable joint structure comprising a first cylindrical tubular member, a second cylindrical tubular member of smaller cross section than that of said first member and positioned with its longitudinal axis transverse to that of said first member, said first member having a first hole in one side thereof of a configuration and size to closely accommodate said second member, one end of said second member extending through said hole and engaging the inner wall opposite said first hole and engaging the wall of said first member adjacent the periphery of said first hole, said first member having a smaller hole in its opposite side in alinement with said first hole along the longitudinal axis of said second member, a rigid plug held by friction in engagement with the inner wall of said second member adjacent said end thereof, said plug extending in frictional engagement with the inner wall of said second member outwardly past said first hole beyond the wall of said first member whereby said plug reinforces said second member, a portion of the wall of said end of said second member adjacent said smaller hole being deformed to conform substantially to the configuration of the adjacent portion of the inner wall of said first member, and means including a screw extending from outside said first member through said smaller hole for engaging said plug and drawing it toward said inner wall and against at least a portion of said deformed end portion for securing said members rigidly together.

2. A detachable joint structure as set forth in claim 1 wherein said plug comprises a rigid body having rib portions peripherally spaced and extending axially, said rib portions constituting the surfaces on said plug for frictional engagement with the inner wall of said second tube.

3. A detachable joint structure as set forth in claim 1 wherein said members are of round cross section and wherein the underside of the head of said screw is conical and said first tube is indented about said small hole to provide a conical countersinking depression for providing a substantial area of face engagement with the head of said screw and wherein said end wall of said second member includes two diametrically opposite end portions engaging the inner wall on opposite sides of said depression and at points on the far side of the inner wall of said first member diametrically opposite the center of said first hole whereby said screw when tightened prevents rotation of said second tube about its longitudinal axis.

References Cited

UNITED STATES PATENTS

| 949,108 | 2/1910 | Abel | 85—32 |
| 2,490,594 | 7/1943 | Madden | 151—41.73 |
| 2,185,268 | 5/1965 | Heine | 151—41.73 X |
| 2,193,680 | 3/1940 | Weissert | 285—189 |
| 2,575,965 | 11/1951 | Malm | 285—191 |
| 2,614,827 | 10/1952 | Peach | 285—192 |
| 3,071,399 | 1/1963 | Cronin. | |

FOREIGN PATENTS 533,640    5/1959    Belgium.

CARL W. TOMLIN, Primary Examiner.

THOMAS F. CALLAGHAN, Assistant Examiner.

U.S. Cl. X.R.

285—189; 85—32; 151—41.73